Aug. 17, 1965  G. C. HARRISON ETAL  3,201,136
PIPE JOINT OF CAST IN PLACE POLYURETHANE
Original Filed July 6, 1960
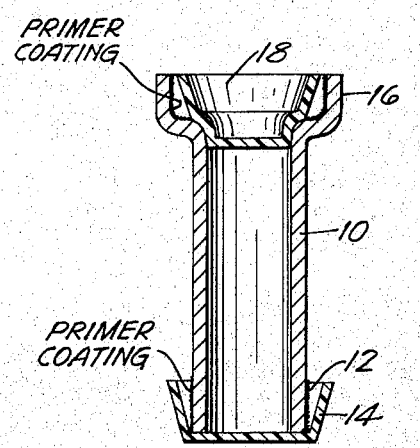
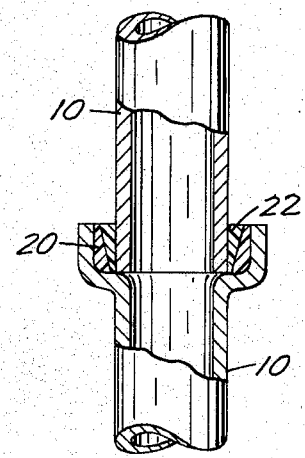
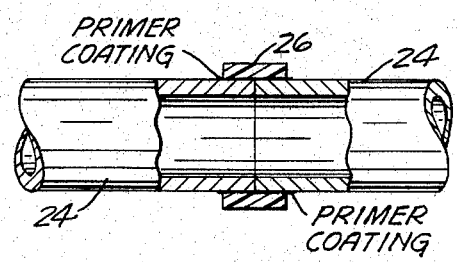
INVENTORS
GEORGE C. HARRISON
LESTER G. AXDAHL
BY Carpenter, Kinney & Coulter
ATTORNEYS

# 3,201,136
PIPE JOINT OF CAST IN PLACE POLYURETHANE George C. Harrison, Roseville, and Lester G. Axdahl, Maplewood, Minn., assignors to Minnesota Mining and Manufacturing Company, St. Paul, Minn., a corporation of Delaware
Original application July 6, 1960, Ser. No. 41,152. Divided and this application Mar. 17, 1965, Ser. No. 440,466
4 Claims. (Cl. 277—198)

This invention relates to new and useful joints for joining sections of vitrified clay pipe to one another. More particularly, this invention pertains to new and useful organic polymer joints connecting vitrified clay pipe sections which solve many heretofore existing problems in the formation, sealing, maintenance and strength of such joints and to polymer compositions therefor. This application is a continuation-in-part of our copending application Serial No. 795,987, filed February 27, 1959, now abandoned, and is a division of application Serial No. 41,152, filed July 6, 1960.

In the past, it has been a tedious, difficult, sometimes dangerous and always painstaking job to form joints which would seal when laying vitrified clay pipe sections in end to end relation, whether the pipe sections were of the bell and spigot type or of the plain end type.

In the joining of bell and spigot ceramic pipe sections to be laid underground as in sewer pipe constructions and the like, many joint forming and sealing problems remained unsolved, such as maintenance of seal formation, resistance to attack by sewage and/or soil microorganisms, resistance to root penetration, resistance to seal rupture due to shifting of pipe sections caused by changing soil conditions, and other problems which are caused by or arise from incomplete or ineffective joint seals.

In the formation of such joints in the construction of sewage lines and the like, it has long been the practice to pack the space between each bell and spigot with oakum and then pour in a cement grout or a hot pitch to harden around the oakum.

With either construction, the initial formation of the seal is awkward and time consuming, necessitating digging a bell hole in the ditch bottom beneath the bell end at each joint in the laying of the pipe to enable the workman to pack the bottom portion of the joint with the oakum and pour the pitch or grout thereinto. The workman then must contort himself into position in the ditch to pack the space between the bell and spigot, usually head down toward the deepest portion of the ditch where he is placed in a difficultly extricable position and is prone to entrapment by caveins or collapsing ditch walls. There are other disadvantages incident to the use of hot pitch, and cement grout. The possibility of burning the workmen in the ditch as the pitch is lowered to them is ever-present; and the additional workmen required either to heat and carry the pitch or to mix and carry the grout to its point of application in the ditch becomes increasingly more uneconomical.

Both the cement backed oakum and the pitch backed oakum lose their sealing function as the backing material hardens and embrittles and the oakum rots or is decomposed by sewage and/or soil bacteria. The joint loses flexibility and shrinks away from the pipe ends in a very short time, and becomes prone to cracking and rupture under differential loading occasioned by soil shifts. All these shortcomings result in leaky joints and resulting maintenance problems and health hazards.

In more recent years, to reduce the hazards, time and manpower required forming bell and spigot joints, and to create longer lasting joints, bell and spigot end pipe sections have been provided with in-plant installed plastisol gaskets or sealing rings composed of plasticized vinyl chloride polymer, one of these rings being adhered to the outer surface of the spigot end and the other being affixed to the inner surface of the bell of each section, the mating rings of adjacent bell and spigot ends interfitting with one another in a variety of fashions, as for example, by tapering the gaskets to interfit as ground glass stoppers fit into bottles, or being complementarily ribbed to interlock with one another, to provide a pipe joint.

While these plastisol gaskets have reduced many of the joint problems encountered with the oakum packings, these plastisol joints are not free of problems. For example, in the formation of the plasticized vinyl polymer rings on the pipe ends, it is necessary that they be heat converted to a solid state by heat conversion after their application to the pipe end, requiring an oven baking operation of each pipe section and cooling thereafter, sometimes resulting in "cold checking," which is the formation of cracks and striations in the ceramic pipe. Pipe weakened in this manner sometimes breaks on joining the pipe sections. Although these vinyl chloride polymers are heavily plasticized, e.g., usually about 40% by weight plasticizer, to achieve resiliency, and maintain flexibility, they are still extremely hard at low, e.g., near freezing, atmospheric temperatures, requiring great force to overcome the compressive resistance normally encountered, and causing splitting of the bell end of the pipe section laid prior thereto. On the other hand, on extremely hot days, when the pipe and temperature gets up around 100° F. the vinyl gaskets become exceptionally soft and permanently deformable. As dirt fill is applied over the laid pipe sections, the differential load readily permanently deforms the softened gaskets and creates a permanent gap in the joint.

Also, the plasticizers useful in the plasticizing of the vinyl plastic gaskets for pipe joints are prone to leaching and/or to attack by microorganisms normally found in sewage and/or soil; the attack by these microorganisms reduces the gasket volume, shinks them away from one another and destroys the joint seal.

Yet another problem connected with the use of vinyl gaskets is the poor recovery of the vinyl rings from compression, and permanent deformation of these rings often occurs on storage or in transit when the pipe sections are stacked one upon the other or even at the job site when a heavy pipe section is rested with the vinyl ring or gasket on a hard surface. These permanently depressed ring areas form permanent gaps in the pipe joints they form. Vinyl is also subject to cold flow, whereby the rings, when in pressural contact with one another over long periods of time tend to flow away from the areas of contact thereby disrupting the joint seal.

With the increasing population densities, and the requirement for treating sewage at central sewage plants prior to disposal, the necessity for more easily formed, longer lasting and sealing bell and spigot joints becomes more apparent. Exfiltration of sewage water through leaking joints lowers the fluid in the sewer line which can result in clogging by insufficient flow to carry the sewage solids; the escaping sewage fluid fertilizes the surrounding soil, spawning plant growth and subsequent root penetration into the pipe through the joint, again leading to clogging or pipe fracture; also, this escaping fluid contaminates the surrounding soil creating health hazards. Infiltration through leaky joints is also undesirable, causing pipe line flooding in times of heavy subsurface drainage, and, even in non-flooding amounts, increasing the quantity of sewage fluid that must be treated at disposal plants. Also, the points of leakage allow mud and dirt to seep into the pipe line to disrupt line flow as well as to provide easy access for roots to the pipe interior.

We have discovered that certain polyurethane elastomers form unique ceramic pipe joints for both bell and spigot and plain end vitrified clay pipe. Joints of these polyurethane elastomers have been found to possess a balance of properties heretofore unattainable in the field of clay pipe joints.

It is an obect of this invention to provide ceramic pipe joints of a polymeric nature which can be formed and solidified without the application of heat and which, when formed, are resistant to soil and sewage microorganism attack, attack by acids and alkalis, and which are free from cold flow or compression set, are water resistant, and which are economical—a consideration of prime importance in this field. It is another object to provide new and useful compositions for making such joints, and to provide new and useful polymer compositions having greatly increased heat and sunlight storage resistance.

The polyurethane elastomers we have discovered to be useful as joint forming seals between ceramic pipe sections, and particularly useful as sealing rings to form vitrified clay pipe joints for sewer tiles and the like are filled alkali and acid resistant "cold cured" polyurethane elastomers, which elastomers possess low water sensitivity, and relative inertness to attack by sewage and soil microorganisms, e.g., anaerobic and aerobic microorganisms, and which are not subject to plastic cold flow and/or permanent compression set when subjected to load. By "cold cured" is meant that the elastomers approach their final solid properties from a liquid, or at least moldable, state at ambient room temperatures, e.g., from about 45° F. to about 100° F., in commercially feasible short periods of time, e.g., about 72 hours or less.

A cold cured elastomer useful in the practice of this invention comprises the reaction product of a moldable reaction mixture of an organic diisocyanate and a flowable, acid and alkali resistant, biologically inert, water resistant polyalkylene ether glycol having a molecular weight between about 750 and 4500 and containing predominantly secondary terminal hydroxyl groups, said mixture having an isocyanate to hydroxyl ratio of about 0.9:1 to 1.1:1 and including as a co-reactant a component selected from the group consisting of organic triols and triisocyanates and combinations thereof, said co-reactant being present in an amount sufficient to create one crosslink for each 5,000 to 100,000 molecular weight of final elastomer whereby the elastomer will not be subject to compression set or cold flow. Said mixture further containing a finely divided inert filler to body the elastomer, and containing a catalytic amount of a soluble metal compound in the presence of which the mixture converts at ambient temperature in a single stage continuous reaction to a solid, sewage and soil microorganism resistant non-porous elastomer approaching its final properties, i.e. substantially free from further reactive groups, within about 72 hours.

Useful soluble metal compounds which function as cold curing catalysts are, for example, certain organo-tin compounds of tetravalent tin, which may be defined as the organo-tin compounds having at least one tin to chalcogen valence bond. Representative groups of these tin catalysts are the organo-tin oxides, hydroxides, carboxylates $$(\overset{|}{\underset{|}{Sn}}-O-\overset{O}{\overset{\|}{C}}-)$$

alcoholates 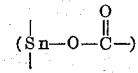, or combinations thereof.

Representative examples of effective tin catalysts of this group are dibutyl tin diacetate, dibutyl tin di-2-ethyl hexoate, dibutyl tin oxide, dibutyl tin monomethoxy methyl maleate, dibutyl tin sulfide, tributyl tin 2-ethyl hexoate, monobutyl tin tri-2-ethyl hexoate, triphenyl tin hydroxide, bis-(tributyl tin) oxide, bis-(tributyl tin) tetrapropenyl succinate, bis-(tri-butyl tin) n-nonyl succinate, and bis- (tributyl tin) malonate. Any of the foregoing catalysts are useful in the formation of low temperature curing, or cold cured, ceramic pipe joints in accordane with this invention.

Another group of cold curing catalysts for these liquid hardenable polyurethane reaction systems are represented by the soluble organic acid salts of lead, bismuth, antimony, mercury, and tin, particularly the fatty acid salts. Representative of these metal salts are those of the fatty acids which are soluble in the glycol and urethane reaction mixture. A preferred group of catalysts are the lead salts such as lead octoate (lead di-2-ethyl hexoate) and lead naphthenate and similar lead drying salts.

Useful polyalkylene ether glycols in the practice of the invention are those glycols and glycol mixtures which may be structurally represented by the idealized formula H(OR—OR')$_n$OH, wherein R and R' are the same, or different, alkylene radicals each averaging at least 3 carbon atoms and preferably arranged to provide predominantly secondary hydroxyl terminal groups in the resultant polyether polymer. These alkylene radicals represent the polymeric chain forming portions of the starting polyols and/or alkylene oxides from which the polyether glycol is formed; and, $n$ is an integer sufficiently large to provide a glycol or glycol mixture having an average molecular weight between about 750 and about 4500, and preferably to provide a liquid glycol or glycol mixture having an average molecular weight between about 1000 and 2000. While in the idealized formula, R and R' are indicated as being present in equal amounts in a predictably alternating fashion, it is more likely that one or the other will predominate and that the fashion in which they link together in the polyether chain is not so predictable; consequently, the structural representation should be looked at primarily as a visual aid in the comprehension of the polymer structure, rather than as a limiting structural formulation.

These polyalkylene ether glycols may be derived from the polymerization of cyclic ethers such as 1,2-propylene oxide, 1,2-butylene oxide, 2,3-butylene oxide and similar oxirane cyclics initiated with glycols such as propylene glycol, butylene glycol, and mixtures of such glycols. Small amounts of other cyclic oxides such as epichlorhydrin or styrene epoxide can be included in these glycol systems so long as the addition does not increase the glycol viscosity beyond a workable state. These ether glycols may also be made by polymerization of cyclic ethers alone. As will appear hereinafter, some triols such as hexane-1,2,6 triol may be included in the ether glycol formation.

Organic polyisocyanates and particularly the various aliphatic and aromatic diisocyanates, are useful in the practice of this invention. Representative of such diisocyanates are hexamethylene diisocyanate, naphthalene-1,5-diisocyanate, para-phenylene diisocyanate, tolyene diisocyanate, or mixtures of these diisocyanates. Because of their ready availability a mixture of the 2,4- and 2,6-tolylene diisocyanate isomers is preferred in the practice of this invention.

In addition to the polyether glycols and diisocyanates, some further hydroxyl and/or isocyanate compounds should be present in the reaction mixture to provide the reaction mixture with sufficient crosslinking sites to provide a sufficiently tough, stiff, compression set and cold flow resistant solid elastomer to serve as a joint sealing elastomer for vitreous clay pipe joints. This further functionality may be readily built into the polyether glycol side of the system or into the diisocyanate side of the system or into both sides of the system by the inclusion in either or both sides of the system of components possessing further reactive groups. Thus, a small amount of a triol tetrol, etc., such as the 1,2,6-hexane triol trimethylol propane, polyalkylene ether triols and tetrols etc. may be included with the polyalkylene ether glycol.

In the polyisocyanate side of the system, a small amount of triisocyanate, such as that provided by the reaction of tolylene diisocyanate and trimethylol propane or other triol, tetrol, etc. as noted in the paragraph preceding, can be included. The amount of such further components should be calculated so that the number of further molecules added to the system by these components is sufficient to provide about one crosslink for each 5000 to 100,000 molecular weight of the final polymer. Too much crosslinking provides polymers which are not sufficiently elastic; with too few crosslinks the elastomer becomes too stretchy and liable to permanently deform under load (cold flow). Preferably, the addition of the crosslinking components to the polymer should be such as to provide polymer having one crosslink for about 10,000 to 20,000 molecular weight.

As indicated hereinbefore, the diisocyanate and the glycol should be combined with one another in such proportions as to provide from about 0.9 to 1.1 NCO for each OH group. Within this range elastomers are produced having durometers in a range most useful in the practice of this invention, namely, about 35 durometer to about 80 durometer as measured by a Shore A2 needle penetrometer.

While even very small amounts of finely divided inert fillers will increase the load bearing characteristics of the elastomer, to assure the requisite amount of load carrying ability in the final elastomer, by volume the elastomer should contain about 10% filler and preferably contains as much filler as can be incorporated thereinto without lessening the tensile strength of the elastomer of the point of uselessness for its intended purpose, the upper limit being about 35% by volume of filler with conventional fillers such as clay. Any suitable finely pulverized inert organic or inorganic material or combination of materials reasonably alkali, acid and water resistant, inert to attack by sewage and soil microorganisms and inert to reaction with elastomer forming reactants may be incorporated into the polymer.

Many clays possess the requisite inertness and biological resistance and are in abundant supply as economical fillers and these fillers are usually added to the polyol position before reaction with the diisocyanate. As an approximation, when the polyglycol portion of the elastomer contains about 60% of its weight as clay this amounts to about 30% by volume clay in finished elastomer when finely pulverized fillers are used. Rottenstone, finely divided silicas, volcanic clays, grog (waste vitrified clay), asbestos, and powdered polystyrene, or the like, are suitable filters. Preferred fillers are heat treated, i.e., partially and fully calcined, clays which do not interfere with catalyst efficiency, and possess to a high degree the other attributes desired. In addition it has been discovered that these clays reinforce the elastomers to a remarkable degree as compared to other fillers.

As a portion of the total weight of the filled elastomer, the catalyzing soluble metal compound amounts to usually an extremely small percent; as low as $3/50$ of 1% and seldom higher than 1%. While many of the catalysts can be used in larger amounts than about 2% without seriously affecting the product, except to plasticize it, such further additions do not significantly increase the reaction rate and expense makes such use extremely uneconomical. Some catalysts, such as the soluble organo-tin-oxy compounds tend to lessen the heat and sunlight storage stability of the polymers and, consequently, it is sometimes advantageous to combine them with tertiary amine catalysts to lower the amount of tin salt necessary in the elastomer. As a percentage of the total weight of reactants, namely the weight of the hydroxyl components and the isocyanate components, for example, the tin catalysts are preferably used in amounts of from about $1/10$ of 1% to about 1% based on the weight of tin in the catalyst. Similar ranges are equally effective utilizing the other catalysts. While greater amounts can be added, they have no beneficial effects and, in fact, with some of the catalysts, such as the lead di-2-ethyl hexoate, amounts as small as about $1/50$ of one percent lead, based on the weight of the reactants, have been found to provide reasonably rapid and complete curing.

These elastomers have remarkable utility in the field of plain end vitrified clay pipe joints, where no joint forming means were heretofore available which were resistant to high internal pressures within the pipes, joints capable of bearing internal pressures up to about 25 lbs. per square inch being the maximum available, and requiring so much time and materials in their formation as to be economically infeasible for most vitrified clay pipe constructions.

The creation of practically useful strong plain end joints has heretofore been unsolved and all pipe joints are invariably formed at the pipe laying site. It has been customary to simply wrap the joints with tarpaper or the like and then cover the pipeline thus laid with soil to hold the tarpaper in place, the tarpaper in turn preventing soil from entering the pipe sections.

In pipelines requiring the inertness of vitrified clay pipe wherein internal pressure must be considered, more complex joint seals have been evolved. One of the more widely used of these complex seals, and the one which withstands the most internal pipeline pressure is a rubber ring, T-shaped in cross section, with the annular stem of the T going between the pipe ends and the crosshead of the T overlying the adjacent ends of adjacent pipe sections. Annular metal clamping rings embrace portions of the cross head overlying the adjacent pipe ends and clamp the crosshead on these pipe ends. This clamping prevents axial shifting of the pipe sections relative to one another. To complete the seal, on the exposed surface of the annular crosshead of the ring is cast a finish layer of cement which, upon hardening, prevents lateral shifting of the pipe sections with respect to one another. Such a joint, although of difficult and expensive assembly, enables the pipe to carry fluids and the like which create internal pressures up to about 25 lbs. per square inch. Plastisols exhibit too much cold flow to be of value as plain end pipe joints.

The polyurethane elastomer joints of this invention in connecting plain end vitrified clay pipe sections to one another provide joints which withstand internal pressures up to about 250 lbs. per square inch and which are sufficiently strong to enable the in-plant joining of 4 and 5 foot pipe sections into lengths of twenty feet or more without danger of joint rupture under handling and transport conditions.

The polyurethane joints of this invention are inert to attack from sewage and/or soil microorganisms. They are highly resistant to cold flow; i.e., dimensional change under static load; they possess relatively uniform resilience and flexibility over a wide range of atmospheric temperatures; they possess low compression set; i.e., are resistant to permanent deformation by heavy compressive weight thereon; they are resistant to common aliphatic solvents, acids and alkalis and possess high internal, or cohesive strength. The clay pipe industry has never before had such a joint.

Referring now to the accompanying drawings, FIGURE 1 illustrates in cross section the formation of sealing gaskets for bell and spigot type pipe ends;

FIGURE 2 represents a completed bell and spigot joint; and

FIGURE 3 represents a completed plain end joint.

Referring in detail first to FIGURE 1, a bell and spigot pipe section 10 is disclosed in cross section and standing upright resting on the spigot end 12 thereof in a pan shaped mold 14. Within the bell end 16 of the pipe section 10 is disposed a second mold 18, the sidewalls of which are inclined at generally the same angle as the sidewalls of the pan shaped mold 14.

The inside surface of the bell end 16 of the section 10 and the outside surface of the spigot end 12 of the pipe section are coated with a primer to promote adherence thereto of the polyurethane rubber rings or gaskets to be formed therein. The primer coating may be a synthetic rubber-phenolic coatable adhesive, an epoxy resin, neoprene or the like. The gaskets or sealing rings are formed by simply pouring the liquid reaction mixture forming the solid polyurethane rubber gaskets or rings into the mold spaces provided between the molds and the pipe walls. As the liquid mixture hardens it forms bell and spigot rings such as 20 and 22 of FIGURE 2. Upon the solidification of the polyurethane rubber, the molds 14 and 18 may be removed and the pipe section joined to similarly prepared pipe sections in the manner shown in FIGURE 2 wherein two pipe sections 10 are joined bell end to spigot end by frictionally interfitting the bell gasket 20 with the spigot end gasket 22 to provide a polyurethane rubber joint between the sections.

Bell and spigot end vitrified clay pipe sections of 4 inch diameter were joined to one another utilizing the 92–8 polyurethane rubber of Example I (following) through the medium of joint forming gaskets such as 20 and 22 illustrated in the drawings. These pipe sections, laid in a ditch and joined to one another form part of a sewage system and have been subjected to raw sewage, (active sludge), for a period of more than 6 months under normal weathering and sewage conditions. Inspection at the end of 6 months revealed no change or failure in the joint whatsoever, except for some slight discoloration of the sealing rings.

Two 5 foot 21 inch I.D., heavy duty, vitrified clay pipe sections having plain ends such as illustrated in FIGURE 3 and designated by the number 24, were joined in end to end relation by casting collars 26 of the 92–8 polyurethane rubber over the abutting ends thereof to provide a total pipe length of 10 feet, being made up of the collar joined sections. The resulting weight was over 1800 lbs. and yet the joined sections could be lifted from one end thereof without disrupting the joint between any two sections formed by the collars 26. Fluid pumped through similarly joined sections of 4 inch I.D. pipe under pressures as high as 250 lbs. per square inch failed to disrupt the joints.

The examples following illustrate the preparation of certain of the preferred polyurethane elastomers useful in the practice of this invention.

EXAMPLE I

An excellent, high strength, room temperature cured polyurethane elastomer results upon combining the following two parts. All percents are weight percents unless otherwise specified.

Part A

| | Percent |
|---|---|
| Filler | 54 |
| Polypropylene glycol (M.W. average 1360) | 45 |
| Dibutyl tin dilaurate (22% by weight tin) | 1 |

The dibutyl tin dilaurate is a catalyst for curing polyurethane elastomers at low temperatures. Powdered clay and rottenstone are used in equal proportions as the inert filler and are present in Part A as a powdered suspension. Coloring agents may be added.

The resulting product is a mobile liquid, cream to light brown in color having a specific gravity of about 1.50.

Part B

| | Pts. (wt.) |
|---|---|
| Toluene diisocyanate | 100 |
| Trimethylol propane | 10 |

The toluene diisocyanate (TDI) and the trimethylol propane are mixed at about 40° C. and then heated to about 135° C. for several hours to form an adduct which is a clear yellow mobile liquid having a specific gravity of about 1.24.

Upon mixing 92 parts A with 8 parts B, by weight, a polyurethane resin results which changes from a pourable, liquid state to a tough, unplasticized polyurethane elastomer in a short time at normal room temperatures. The period of time during which the resin remains sufficiently liquid to be poured into a mold and the period of time required before the resulting rubber can be demolded at different temperatures is given hereinbelow.

| Temperature, °F. | Pour Time, minutes | Demold Time |
|---|---|---|
| 45 | 30 | 24–72 hours. |
| 75 | 6–8 | 6–8 hours. |
| 125 | 1–2 | 6–8 min. |

The resulting rubber has a durometer of about 50, (Shore durometer-$A_2$ scale) and a specific gravity of about 1.47. In curing from a liquid to a solid, the rubber shrinks less than 2%. The solid rubber is stable to dilute acids and alkalis, and water, and is unaffected by aliphatic solvents. The rubber has a compression set as measured by ASTM procedure D395–55 (modified to be run at room temperature) of 4–6%. In a compression-deflection test, a 1 sq. in. section ½ inch thick deflected 0.220 inch under a 1000 lb. load with complete regain.

A typical 92–8 rubber has a tensile strength at 75° F. of over 300 p.s.i. and an elongation of 160–180%.

By changing the weight ratio of Part A to Part B in the rubber formulation by nominal amounts, the hardness of the final rubber is significantly affected as is evident from the following comparisons.

| Ratio of A to B | NCO/OH | Durometer, Shore $A_2$ Scale |
|---|---|---|
| 93–7 | 0.93:1 | 35–45 |
| 92–8 | 1.06:1 | 45–55 |
| 91–9 | 1.19:1 | 55–70 |

While polyesters may be used in place of the polyalkylene ether glycols in some applications, these are not recommended as polyester based polyurethane elastomers are ordinarily not inert to alkali hydrolysis and most are attacked by sewage microorganisms.

A preferred group of compositions for use as sewer tile joint gaskets and the like are those wherein the glycol part of the mixture contains finely pulverized calcined, or partially calcined clays as filler and a soluble carboxylic acid lead salt as catalyst. These compositions have been found to provide polyurethane polymers after mixing which have superior heat stability, strength, and yard storage properties.

A specific formulation utilizing such clay and catalyst combination is given in the example following.

EXAMPLE II

Part A

| | Parts by wt. (approx.) |
|---|---|
| Polypropylene glycol (63% 2025 M.W.), (37% 1025 M.W.) | 105 |
| Fully calcined clay | 90 |
| Lead-di-2-ethyl hexoate | 1 |

Part B

| | |
|---|---|
| TDI | 100 |
| TMP | 10 |

The mixing amounts and procedures are the same as those of Example I.

The resulting elastomer when cast in a mold at room temperature can be demolded within about 30 minutes of the pouring and cures to a tough solid product having a final durometer of about 60 after 24 hours, and a durometer of about 58 three hours after demolding.

Samples placed in 1% sodium hypochlorite, 20% sulfuric acid, 5% sodium hydroxide, 1% ferric chloride, aqueous solutions and in water alone for periods of 60 days displayed no appreciable changes in properties. Water pick-up is less than about 1%.

The elastomer was free from compression set, or cold flow, when measured by the tests described in Example I.

These calcined clay containing polymers not only provide remarkable increases in tensile strengths of solid polymers as compared to other clays as noted hereinbefore, but in addition these calcined clays, being of a particle size range of from 1 to about 10 microns, and usually under 7 microns, are capable of remaining relatively homogeneously distributed throughout a relatively long period of time when included as an ingredient of Part A. Further, upon being calcined, these clays having evolved water of constitution, attain a different molecular structure which apparently makes them infinitely more resistant to attack by alkalis and acids than are ordinary clays and these features coupled with their inertness to the promotion of side reactions of the catalysts when in a storable system place these clay fillers in a unique preferred position in the castable polymers of this invention.

As a practical convenience, the polyol, filler, processing aids and catalysts, as noted in the paragraphs preceding, are generally premixed to form a single storable component and, with suitable processing aids and a closed storage container, remain storage stable for periods of 6 months and more for subsequent reaction with a diisocyanate in the formation of a cast, solid polymer.

While the invention has been described with reference to certain preferred polymers and catalysts in the formation of clay pipe joints, it is to be understood that these specific examples are illustrative rather than limiting. Not only have applicants succeeded in producing a new kind of clay pipe joint not heretofore available in the clay pipe industry, but they have also provided certain new and useful compositions for the formation of such joints. Consequently, the ambit of the invention is to be limited only as required by the appended claims.

What is claimed is:

1. A method for casting in place on the end of a pipe section a solid, dimensionally stable, alkali and acid resistant, biologically inert, non-porous, unplasticized, polyurethane polymer rubber sealing gasket, which sealing gasket is adapted to interfit with a complementary gasket in an adjacent pipe section to seal the joint between sections, said method comprising (a) providing a mold form around the end of the pipe section on which the gasket is to be cast, (b) pouring into said form an elastomer forming liquid reaction mixture consisting essentially of an aromatic diisocyanate, a 1,2-polyalkylene ether glycol represented by the formula

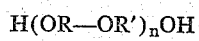

$$H(OR\text{---}OR')_nOH$$

wherein R and R' are members of the group consisting of alkylene radicals containing 3 to 4 carbon atoms whereby the glycol contains predominantly secondary hydroxyl groups, and $n$ is an integer sufficiently large to provide a polyalkylene ether glycol having an average molecular weight of between about 750 and 4500, and a cross-linking member selected from the group consisting of organic triols and organic triisocyanates, said diisocyanate, polyalkylene ether glycol and cross-linking member being mixed with one another in a ratio of about 0.9:1.1 isocyanate groups for each reactive hydroxyl group, said reaction mixture having incorporated therein an inert solid filler and containing a catalyst causing the reactants to substantially completely react and solidify in no more than about 72 hours at a temperature range of about 45° F. to 100° F. to a solid, homogeneous elastomer, (c) curing the liquid reaction mixture to a solid gasket substantially free from further reactive groups and having a durometer of about 35 to 80 as measured by a Shore A2 needle penetrometer in a single stage continuous reaction at a temperature of from about 45° F. to about 100° F. and (d) removing said mold form after said gasket has cured to a solid self-sustaining state.

2. A method for casting in place on the end of a pipe section a solid, dimensionally stable, alkali and acid resistant, biologically inert, non-porous, unplasticized polyurethane polymer rubber sealing gasket, said method comprising (a) coating the end of a pipe section on which the gasket is to be cast with a primer coating for polyurethane rubber, (b) providing a mold form around the end of the pipe section on which the gasket is to be cast, (c) pouring into said form an elastomer forming liquid reaction mixture consisting essentially of an aromatic diisocyanate, a 1,2-polyalkylene ether glycol represented by the formula $H(OR\text{---}OR')_nOH$ wherein R and R' are members of the group consisting of alkylene radicals containing from 3 to 4 carbon atoms whereby the glycol contains predominantly secondary hydroxyl groups, and $n$ is an integer sufficiently large to provide a polyalkylene ether glycol having an average molecular weight of between about 750 and 4500, and a cross-linking member selected from the group consisting of organic triols and organic triisocyanates, said diisocyanate, polyalkylene ether glycol, and cross-linking member being mixed with one another in a ratio of about 0.9:1.1 isocyanate groups for each reactive hydroxyl group, said reaction mixture having incorporated therein an inert solid filler and further containing a catalyst causing the reactants to substantially completely react and solidify in no more than about 72 hours at a temperature range of about 45° F. to about 100° F. to a solid, non-porous elastomer, said solid filler constituting from about 10 to about 35% by volume, (d) curing the liquid reaction mixture to a solid gasket substantially free from further reactive groups and having a durometer of about 35 to 80 as measured by a Shore A2 needle penetrometer in a single stage continuous reaction at a temperature of about from 45° F. to 100° F., and (e) removing said mold form after said gasket has cured to a solid, self-sustaining state.

3. A method for casting in place on the end of a pipe section a solid, dimensionally stable, alkali and acid resistant, biologically inert, non-porous, unplasticized polyurethane polymer rubber sealing gasket, said method comprising (a) providing a mold form around the end of the pipe section on which the gasket is to be cast, (b) pouring into said form an elastomer forming liquid reaction mixture consisting essentially of an aromatic diisocyanante, a 1,2-polypropylene ether glycol having an average molecular weight of from about 750 to 4500, and a cross-linking member selected from the group consisting of organic triols and organic triisocyanates, said cross-linking member being present in an amount sufficient to provide at least about one cross-link for each 5,000 to 20,000 molecular weight of final polymer, said diisocyanate, 1,2-polypropylene glycol, and cross-linking member being mixed with one another in a ratio of about 0.9:1.1 isocyanate groups for each reactive hydroxyl group, said reaction mixture having incorporated therein an inert solid filler and further containing a catalyst causing the reactants to substantially completely react and solidify in no more than about 72 hours at a temperature range of about 45° F. to about 100° F. to a solid, non-porous elastomer, said solid filler constituting from about 10 to about 35% by volume, (c) curing the liquid reaction mixture to a solid gasket substantially free from further reactive groups and having a durometer of about 35 to 80 as measured by a Shore A2 needle penetrometer in a single stage continuous reaction at a temperature of about from 45° F. to 100° F., and (d) removing said mold form after said gasket has cured to a solid, self-sustaining state.

4. A flexible pipe joint connecting the adjacent ends of ceramic pipe sections to one another, said joint comprising a solid, non-porous low temperature cured polyurethane rubber tenaciously adhered to the adjacent end portions of said pipe sections and sealingly joining said sections to one another, said polyurethane rubber being substantially inert to attack from sewage and soil carrying microorganisms and comprising the low temperature cured solid product of an elastomer forming liquid reaction mixture consisting essentially of an aromatic diisocyanate, a 1,2-polyalkylene ether glycol represented by the formula $H(OR-OR')_nOH$ wherein R and R' are members of the group consisting of alkylene radicals containing from 3 to 4 carbon atoms whereby the glycol contains predominantly secondary hydroxyl groups, and $n$ is an integer sufficiently large to provide a polyalkylene ether glycol having an average molecular weight of between about 750 and 4500, and a crosslinking member selected from the group consisting of organic triols and organic triisocyanates, said reaction mixture having incorporated therein an inert, solid filler, said polyisocyanate and polyalkylene ether glycol having been mixed with one another in a ratio of about 0.9:1.1 NCO— groups for each reactive —OH group, in the presence of a catalyst causing the reactants to substantially completely react and solidify in no more than about 72 hours at a temperature range of about 45° F. to 100° F., said reaction mixture having been cured in a single stage continuous reaction at a temperature range of about 45° F. to 100° F. to a solid state substantially free from further reactive groups and having a durometer of about 35 to 80 as measured by a Shore A2 needle penetrometer.

References Cited by the Examiner

UNITED STATES PATENTS

| | | | |
|---|---|---|---|
| 2,846,408 | 8/58 | Brochhagen et al. | 260—2.5 |
| 2,866,774 | 12/58 | Price | 260—77.5 |
| 2,871,227 | 1/59 | Walter | 260—77.5 |
| 2,889,582 | 6/59 | Cooper | 285—291 |
| 2,897,181 | 7/59 | Windemuth | 260—75 |
| 2,948,691 | 8/60 | Windemuth et al. | 260—77.5 |
| 3,054,627 | 9/62 | Ligon | 285—291 |
| 3,098,658 | 7/63 | Murphy | 260—77.5 |
| 3,135,519 | 6/64 | Ligon et al. | 277—207 |

FOREIGN PATENTS 733,624   7/55   Great Britain.

OTHER REFERENCES

Dombrow: "Polyurethanes," Reinhold Pub. Corp., New York, 1957, page 113.

LEON J. BERCOVITZ, *Primary Examiner.*

Disclaimer 3,201,136.—*George C. Harrison*, Roseville, and *Lester G. Axdahl*, Maplewood, Minn. PIPE JOINT OF CAST IN PLACE POLYURETHANE. Patent dated Aug. 17, 1965. Disclaimer filed May 25, 1972, by the assignee, *Minnesota Mining and Manufacturing Company*.

Hereby enters this disclaimer to all claims of said patent.

[*Official Gazette August 15, 1972.*]